(12) United States Patent
Zhang et al.

(10) Patent No.: US 11,901,566 B2
(45) Date of Patent: Feb. 13, 2024

(54) BIFUNCTIONAL OXYGEN ELECTROCATALYST, PREPARATION METHOD AND USE THEREOF

(71) Applicant: Tsinghua University, Beijing (CN)

(72) Inventors: Rufan Zhang, Beijing (CN); Chenhui Zhou, Beijing (CN); Haibing Meng, Beijing (CN); Ying Han, Beijing (CN)

(73) Assignee: Tsinghua University, Beijing (CN)

( * ) Notice: Subject to any disclaimer, the term of this patent is extended or adjusted under 35 U.S.C. 154(b) by 284 days.

(21) Appl. No.: 17/497,034

(22) Filed: Oct. 8, 2021

(65) Prior Publication Data

US 2022/0190357 A1 Jun. 16, 2022

(30) Foreign Application Priority Data

Dec. 14, 2020 (CN) .......................... 202011471559

(51) Int. Cl.
*H01M 4/92* (2006.01)
*H01M 12/08* (2006.01)
*H01M 4/86* (2006.01)

(52) U.S. Cl.
CPC .......... *H01M 4/923* (2013.01); *H01M 12/08* (2013.01); *H01M 2004/8689* (2013.01)

(58) Field of Classification Search
CPC .... B01J 23/60; B01J 23/6525; B01J 23/6562; B01J 23/89; B01J 37/04; B01J 37/08; H01M 4/923; H01M 12/08; H01M 2004/8689

USPC ....... 502/326, 329, 331, 324, 337–339, 313, 502/315, 316
See application file for complete search history.

(56) References Cited

U.S. PATENT DOCUMENTS

| | | | | |
|---|---|---|---|---|
| 5,759,947 A | * | 6/1998 | Zhou | ..................... B01D 53/865 |
| | | | | 502/304 |
| 2002/0183200 A1 | * | 12/2002 | Sato | ........................ B01J 37/03 |
| | | | | 502/325 |

FOREIGN PATENT DOCUMENTS

| | | | | | |
|---|---|---|---|---|---|
| CN | 106784892 B | * | 8/2019 | ............. | H01M 4/90 |
| CN | 113241452 B | * | 9/2022 | ............ | H01M 4/921 |
| CN | 115360363 A | * | 11/2022 | ............ | B82Y 40/00 |
| GB | 1400948 A | * | 7/1975 | ......... | C25B 11/0442 |
| JP | 2002255548 A | * | 9/2002 | ............ | B01D 53/14 |
| JP | 2004292188 A | * | 10/2004 | ............ | C01B 13/18 |
| WO | WO-2013187976 A1 | * | 12/2013 | ............ | C01G 15/00 |
| WO | WO-2017214274 A1 | * | 12/2017 | ............ | H01M 12/08 |

* cited by examiner

*Primary Examiner* — Patricia L. Hailey
(74) *Attorney, Agent, or Firm* — Kirk A. Wilson; Joseph T. Guy; Patent Filing Specialist Inc.

(57) ABSTRACT

A bifunctional oxygen electrocatalyst, a preparation method and use thereof are disclosed. The bifunctional oxygen electrocatalyst is represented by A1-x-yBxCyO2, wherein element A is one selected from the group consisting of Pt, Ir, Ru, and Pd, and each of element B and element C is selected from the group consisting of Mo, Mn, Fe, Co, Ni, Cu and Zn; the bifunctional oxygen electrocatalyst is a three-dimensional porous foam sheet catalyst; optionally, the element B is the same as the element.

13 Claims, 6 Drawing Sheets

BIFUNCTIONAL OXYGEN ELECTROCATALYST, PREPARATION METHOD AND USE THEREOF

CROSS REFERENCE TO RELATED APPLICATION

This application claims the benefit and priority of Chinese Patent Application No. 202011471559.4 filed on Dec. 14, 2020, the disclosure of which is incorporated by reference herein in its entirety as part of the present application.

TECHNICAL FIELD

The present disclosure relates but is not limited to the field of bifunctional oxygen electrocatalysts, especially to a bifunctional oxygen electrocatalyst, a preparation method and use thereof.

BACKGROUND OF THE INVENTION

Zinc-air battery is a new type of green and environmentally-friendly energy battery, which has the advantages of high energy density, stable discharge voltage, low raw material cost, and high safety. Therefore, it is considered as a new type of battery with great development prospects. Oxygen in the air could be used as fuel in positive electrode of zinc-air battery, which has an advantage of non-renewable, compared with other batteries in which the positive electrode is non-renewable. The negative electrode zinc has the advantages of abundant reserves, high utilization, high energy density, and low cost. Therefore, it is considered by many researchers to be an ideal power source for electric vehicles. However, the current commercial zinc-air batteries are generally primary batteries, and the non-rechargeability has always restricted its development. Therefore, the development of rechargeable zinc-air batteries is a hot and difficult issue in this field. The main reason why it is difficult to charge a zinc-air battery is the lack of a bifunctional catalyst that could simultaneously catalyze an oxygen reduction/ oxygen evolution under alkaline conditions. In commercial applications, ORR/OER (oxygen reduction/oxygen evolution) bifunctional catalysts is generally prepared by mixing Pt and $IrO_2$, but its poor bifunctional activity and stability, and high cost severely limit large-scale commercial applications.

At present, the research on ORR/OER bifunctional catalysts for air electrodes of zinc-air batteries can be divided into two categories: non-noble metal ORR/OER bifunctional catalysts and noble metal ORR/OER bifunctional catalysts. Non-noble metal catalysts have received widespread attention due to their low cost but considering the current catalytic activity and stability of non-noble metal catalysts, it is still difficult to meet the requirements, and therefore they cannot replace the status of noble metal catalysts. Although the existing noble metal catalysts have good activity for unilateral reactions, for example, Pt has very high activity for ORR, while $IrO_2$ or $RuO_2$ has very high activity for OER. In general, there is still a lack of an ORR/OER bifunctional catalyst with both high activity and excellent stability.

BRIEF SUMMARY OF THE INVENTION

An overview of the topics detailed in this text is as follows. The overview is not intended to limit the scope of the present disclosure.

The present disclosure discloses a method for preparing a multi-metal based bifunctional oxygen electrocatalyst. The method has the characteristics of simplicity, high efficiency, low cost, and environmental friendliness. The catalyst prepared by the same exhibits excellent performance in electrocatalytic oxygen reduction reaction (ORR) and oxygen evolution reaction (OER), and exhibits excellent performance in zinc-air batteries.

The present disclosure discloses a catalyst for an electrocatalytic oxygen reduction reaction and oxygen evolution reaction, which is represented by $A_{1-x-y}B_xC_yO_2$, wherein element A is one selected from the group consisting of Pt, Ir, Ru, and Pd, each of element B and element C is selected from the group consisting of Mo, Mn, Fe, Co, Ni, Cu and Zn; the catalyst is a three-dimensional porous foam sheet catalyst, and optionally, the element B is the same as the element C.

In one embodiment, taking the sum of atomic percentages of the element A, the element B and the element C in the catalyst as 100 at. %, the sum of atomic percentages of the element B and the element C is less than or equal to 60 at. %.

In another aspect, the present disclosure also discloses a method for preparing the above catalyst, comprising the following steps:
1) mixing a metal salt of the element A, a metal salt of the element B, a metal salt of the element C with a carbohydrate and a gas generating compound uniformly in water to form a precursor solution; and
2) pre-sintering the precursor solution, and calcining the product obtained after pre-sintering to obtain the catalyst.

Optionally, the method for preparing the catalyst consists of the above steps.

In one embodiment, the precursor solution is pre-sintered in an oven to obtain a metal salt-supported three-dimensional foam.

In one embodiment, the carbohydrate is one or more selected from the group consisting of chitosan, sucrose, fructose, glucose, maltose, cellulose, starch, hemicellulose, mannose, fructan, xylitol, arabinose, erythrose, sorbitol, xylitol, and *Helianthus tuberosus*.

In one embodiment, the gas generating compound is one or more selected from the group consisting of thiourea, ammonium chloride, urea, and ammonium sulfate.

In one embodiment, in step 1), a concentration of the carbohydrate in the precursor solution is in the range of 0.1-10 mol/L, and preferably 2-8 mol/L.

In one embodiment, a concentration of the gas generating compound in the precursor solution is in the range of 0.1-10 mol/L, and preferably 2-8 mol/L.

In one embodiment, in the precursor solution, the sum of concentrations of the metal salt of the element A, the metal salt of the element B, and the metal salt of the element C is in the range of 0.01-1 mol/L, and preferably 0.01-0.1 mol/L.

In one embodiment, the pre-sintering in step 2) is performed at a temperature of 30-300° C., and preferably 100-200° C.

In one embodiment, the pre-sintering is performed for 0.1-100 h, and preferably 2-20 h.

In one embodiment, the calcining in step 2) is performed at a temperature of 30-800° C., and preferably 300-700° C.

In one embodiment, the calcining is performed for 0.1-100 h, and preferably 1-20 h.

In another aspect, the present disclosure discloses use of the above catalyst in an electrocatalytic oxygen reduction and oxygen evolution reaction.

In one embodiment, the catalyst is used as an air electrode material in a zinc-air battery.

The present disclosure has creatively developed a new type of multi-metal based bifunctional oxygen electrocatalyst, which has the following advantages:

(1) The method has the characteristics of simplicity, high-efficiency, low cost, environmental friendliness, etc., which is easy to realize large-scale and sustainable production.

(2) The electronic structure of the catalyst could be adjusted by changing the content of different metals, so that the catalyst has suitable adsorption energy for oxygen intermediate species (OH* and OOH*), improving the performance of the catalyst in OER and ORR. The obtained catalyst exhibits excellent stability.

(3) When the catalyst is used in an air electrode of the zinc-air battery, the obtained zinc-air battery has very high capacity, power density and excellent cycling stability.

Other features and advantages of the present disclosure will be described in the following description, and partly become obvious from the description, or understood by implementing the present disclosure. Other advantages of the present disclosure could be implemented and obtained by the solutions described in the description.

BRIEF DESCRIPTION OF THE DRAWINGS

The drawings are used to provide an understanding of the technical solutions of the present disclosure, and constitutes as a part of the specification, which is intended to explain the technical solutions of the present disclosure together with the embodiments of the present disclosure, and does not make any limitation to technical solutions of the present disclosure.

DETAILED DESCRIPTION OF THE EMBODIMENTS

Figure 1A:
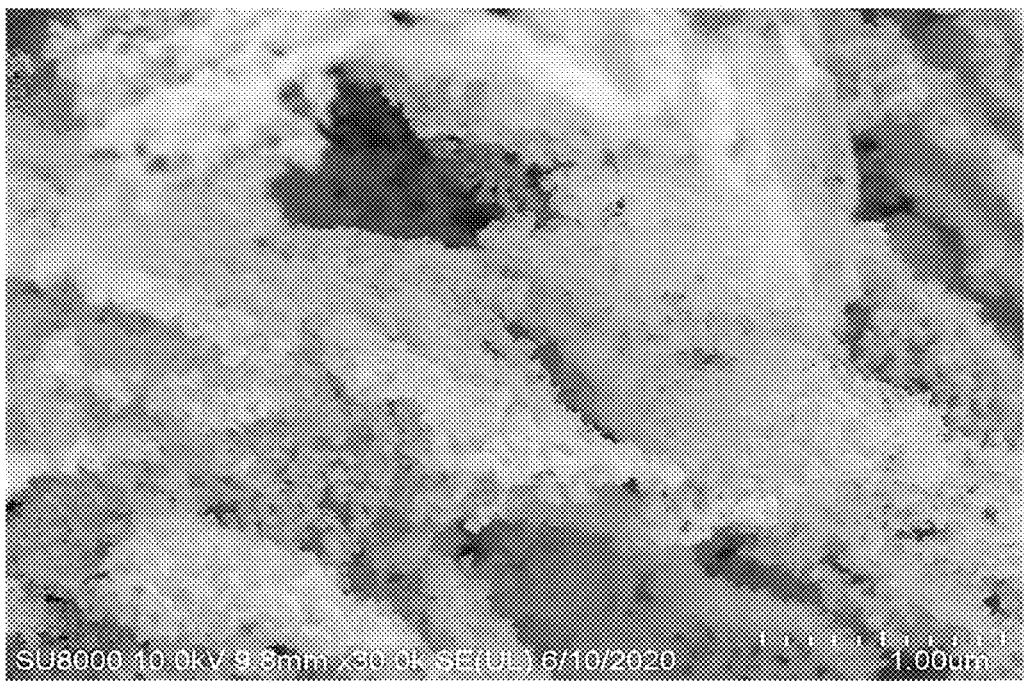
FIGS. 1A-1D show the scanning electron microscope (SEM, in FIG. 1A), transmission electron microscope (TEM, in FIG. 1B and FIG. 1C) and high resolution transmission electron microscope (HRTEM, in FIG. 1D) images of the catalyst prepared in Example 6.
Figure 1B:
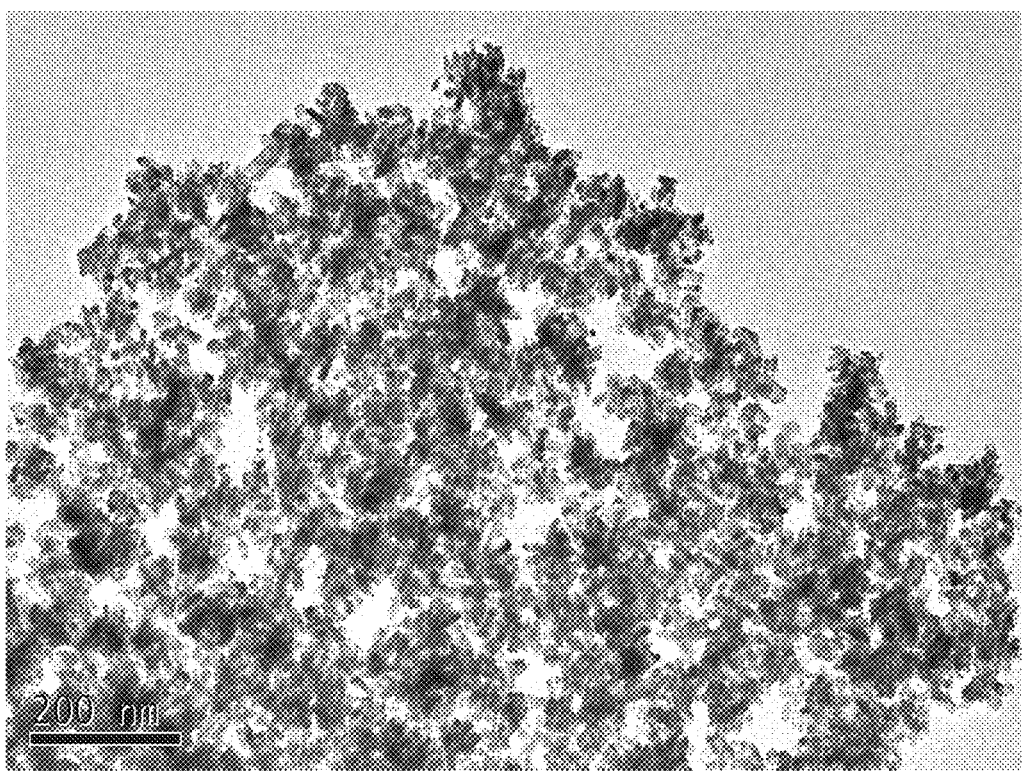
Figure 1C:
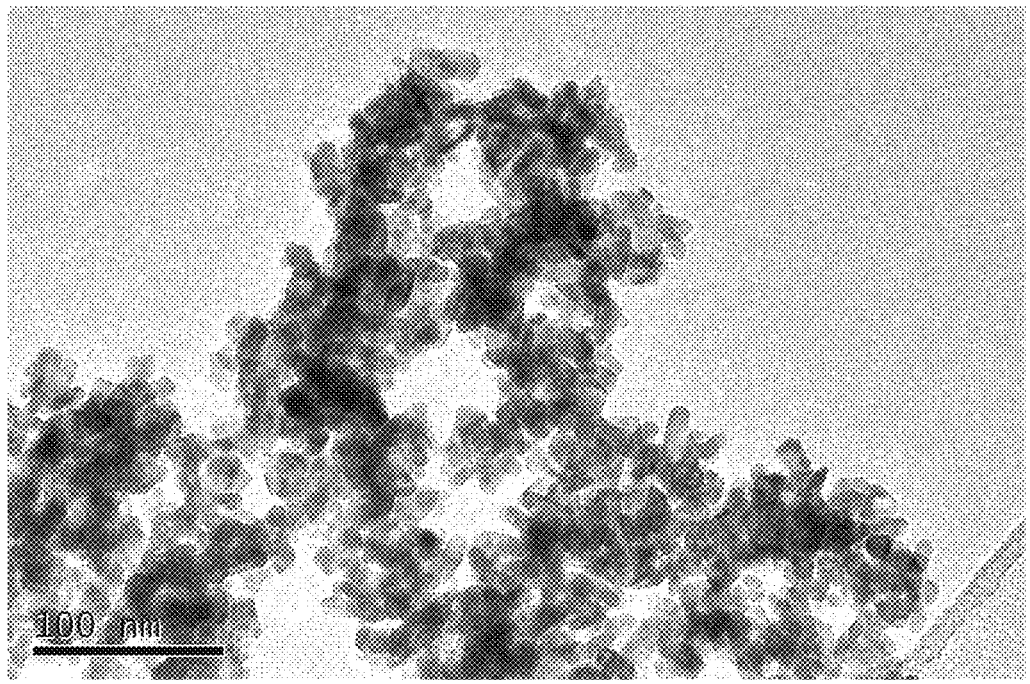
Figure 1D:

In order to make the object, technical solutions, and advantages of the present disclosure clearer, the embodiments of the present disclosure are described in detail below. It should be noted that the embodiments in this disclosure and the features in the embodiments could be combined with each other arbitrarily if there is no conflict.

The raw materials used in the present disclosure are all commercially available analytical pure products without further purification.

The embodiments of the present disclosure disclose a catalyst for an electrocatalytic oxygen reduction reaction and oxygen evolution reaction, which is represented by $A_{1-x-y}B_xC_yO_2$, wherein element A is one selected from the group consisting of Pt, Ir, Ru, and Pd;

each of element B and element C is selected from the group consisting of Mo, Mn, Fe, Co, Ni, Cu and Zn;

the catalyst is a three-dimensional porous foam sheet catalyst;

Optionally, the element B is the same as the element C.

In some embodiments of the present disclosure, the catalyst is a three-dimensional porous foam sheet catalyst.

In some embodiments of the present disclosure, taking the sum of atomic percentages of the element A, the element B, and the element C in the catalyst as 100 at. %, the sum of atomic percentages of the element B and the element C is less than or equal to 60 at. %.

The present disclosure also discloses a method for preparing the above catalyst, comprising the following steps:

1) mixing a metal salt of the element A, a metal salt of the element B, a metal salt of the element C with a carbohydrate and a gas generating compound uniformly in water to form a precursor solution; and 2) pre-sintering the precursor solution, and calcining the product obtained after pre-sintering to obtain the catalyst.

Optionally, the method for preparing the catalyst consists of the above steps.

In some embodiments of the present disclosure, the precursor solution is pre-sintered in an oven to obtain a metal salt-supported three-dimensional foam.

In some embodiments of the present disclosure, the carbohydrate is one or more selected from the group consisting of chitosan, sucrose, fructose, glucose, maltose, cellulose, starch, hemicellulose, mannose, fructan, xylitol, arabinose, erythrose, sorbitol, xylitol and *Helianthus tuberosus*.

In some embodiments of the present disclosure, the gas generating compound is one or more selected from the group consisting of thiourea, ammonium chloride, urea, and ammonium sulfate.

In some embodiments of the present disclosure, in step 1), the concentration of the carbohydrate in the precursor solution is in the range of 0.1-10 mol/L, and preferably 2-8 mol/L.

In some embodiments of the present disclosure, the concentration of the gas generating compound in the precursor solution is in the range of 0.1-10 mol/L, and preferably 2-8 mol/L.

In some embodiments of the present disclosure, in the precursor solution, the sum of concentrations of the metal salt of the element A, the metal salt of the element B, and the metal salt of the element C is in the range of 0.01-1 mol/L, and preferably 0.01-0.1 mol/L.

In some embodiments of the present disclosure, the pre-sintering in step 2) is performed at a temperature of 30-300° C., and preferably 100-200° C.

In some embodiments of the present disclosure, the pre-sintering is performed for 0.1-100 h, and preferably 2-20 h.

In the embodiments of the present disclosure, the calcining in step 2) is performed at a temperature of 30-800° C., and preferably 300-700° C.

In some embodiments of the present disclosure, the calcining is performed for 0.1-100 h, and preferably 1-20 h.

The embodiments of the present disclosure disclose use of the above catalyst in an electrocatalytic oxygen reduction and oxygen evolution reaction.

In some embodiments of the present disclosure, the catalyst is used as an air electrode material in a zinc-air battery.

Example 1

(1) A certain amount of $K_2PtCl_6$ and $FeCl_3$ were weighed and dissolved in deionized water such that the sum of concentrations of metal salts was 0.1 mol/L, wherein the concentrations of $Pt^{4+}$ and $Fe^{3+}$ were 0.05 mol/L and 0.05 mol/L, respectively.

(2) Chitosan and ammonium chloride were subsequently added thereto, and the resulting mixture was continuously stirred, obtaining a clear solution, in which the concentration of chitosan was 1 mol/L, and the concentration of ammonium chloride was 4 mol/L.

(3) The beaker containing the clear solution was placed in an oven and pre-sintered at a temperature of 160° C. for 10 h, obtaining a metal salt-supported three-dimensional chitosan foam.

(4) Finally, the obtained foam was placed in a muffle furnace, calcined at 600° C. under an argon atmosphere for 12 h, washed with deionized water, and dried, obtaining a Pt—Fe based mixed oxide catalyst $Pt_{0.5}Fe_{0.5}O_2$.

Example 2

(1) A certain amount of $K_2PtCl_6$ and $FeCl_3$ were weighed and dissolved in deionized water such that the sum of concentrations of metal salts was 0.01 mol/L, wherein the concentrations of $Pt^{4+}$ and $Fe^{3+}$ were 0.005 mol/L and 0.005 mol/L respectively.

(2) Sucrose and ammonium sulfate were subsequently added thereto, and the resulting mixture was continuously stirred, obtaining a clear solution, in which the concentration of sucrose was 0.1 mol/L, and the concentration of ammonium sulfate was 0.1 mol/L.

(3) The beaker containing the clear solution was placed in an oven and pre-sintered at a temperature of 120° C. for 2 h to obtain a metal salt-supported three-dimensional sucrose foam.

(4) Finally, the obtained foam was placed in a muffle furnace, calcined at 350° C. for 6 h, washed with deionized water, and dried, obtaining a Pt—Fe based mixed oxide catalyst $Pt_{0.5}Fe_{0.5}O_2$.

Example 3

(1) A certain amount of $K_2PtCl_6$ and $CoCl_2 \cdot 6H_2O$ were weighed and dissolved in deionized water such that the sum of concentrations of metal salts was 0.05 mol/L, wherein the concentrations of $Pt^{4+}$ and $Co^{2+}$ were 0.045 mol/L and 0.005 mol/L, respectively.

(2) Fructose and urea were subsequently added thereto, and the resulting mixture was continuously stirred, obtaining a clear solution, in which the concentration of fructose was 4 mol/L, and the concentration of urea was 4 mol/L.

(3) The beaker containing the clear solution was placed in an oven and pre-sintered at a temperature of 120° C. for 5 h to obtain a metal salt-supported three-dimensional fructose foam.

(4) Finally, the obtained fructose foam was placed in a tube furnace, calcined at 400° C. under an ammonia atmosphere for 10 h, washed with deionized water, and dried, obtaining a Pt—Co based mixed oxide catalyst $Pt_{0.9}Co_{0.1}O_2$.

Example 4

(1) A certain amount of $K_2PtCl_6$ and $CoCl_2 \cdot 6H_2O$ were weighed and dissolved in deionized water such that the sum of concentrations of metal salts was 0.05 mol/L, wherein the concentrations of Pt' and Co' were 0.025 mol/L and 0.025 mol/L, respectively.

(2) Maltose and thiourea were subsequently added thereto, and the resulting mixture was continuously stirred, obtaining a clear solution, in which the concentration of maltose was 0.5 mol/L, and the concentration of thiourea was 0.4 mol/L.

(3) The beaker containing the clear solution was placed in an oven and pre-sintered at a temperature of 150° C. for 10 h, obtaining a metal salt-supported three-dimensional maltose foam.

(4) Finally, the obtained maltose foam was placed in a muffle furnace, calcined at 600° C. for 10 h, washed with deionized water, and dried, obtaining a Pt—Co based mixed oxide catalyst $Pt_{0.5}Co_{0.5}O_2$.

Example 5

(1) A certain amount of $IrCl_3$ and $MnSO_4$ were weighed and dissolved in deionized water such that the sum of concentrations of metal salts was 0.1 mol/L, wherein the concentrations of $Ir^{3+}$ and $Mn^{2+}$ were 0.08 mol/L and 0.02 mol/L, respectively.

(2) Glucose and thiourea were subsequently added thereto, and the resulting mixture was continuously stirred, obtaining a clear solution, in which the concentration of glucose was 5 mol/L, and the concentration of thiourea was 0.2 mol/L.

(3) The beaker containing the clear solution was placed in an oven and pre-sintered at a temperature of 140° C. for 10 h, obtaining a metal salt-supported three-dimensional glucose foam.

(4) Finally, the obtained glucose foam was placed in a muffle furnace, calcined at 400° C. for 6 h, washed with deionized water, and dried, obtaining a Ir—Mn based mixed oxide catalyst $Ir_{0.8}Mn_{0.2}O_2$.

Example 6

(1) A certain amount of $RuCl_3$ and $NiCl_2$ were weighed and dissolved in deionized water such that the sum of concentrations of metal salts was 0.2 mol/L, wherein the concentrations of $Ru^{3+}$ and $Ni^{2+}$ were 0.16 mol/L and 0.04 mol/L, respectively.

(2) Glucose and urea were subsequently added thereto, and the resulting mixture was continuously stirred, obtaining a clear solution, in which the concentration of glucose was 5 mol/L, and the concentration of urea was 2 mol/L.

(3) The beaker containing the clear solution was placed in an oven and pre-sintered at a temperature of 140° C. for 10 h, obtaining a metal salt-supported three-dimensional glucose foam.

(4) Finally, the obtained glucose foam was placed in a muffle furnace, calcined at 400° C. for 6 h, washed with deionized water, and dried, obtaining a Ru—Ni based mixed oxide catalyst $Ru_{0.8}Ni_{0.2}O_2$.

Example 7

(1) A certain amount of $PdCl_2$ and $(NH_4)_6Mo_7O_{24} \cdot 4H_2O$ were weighed and dissolved in deionized water such that the sum of concentrations of metal salts was 0.2 mol/L, wherein the concentrations of $Pd^{2+}$ and $MoO_4^{2-}$ were 0.16 mol/L and 0.04 mo/L, respectively.

(2) Sucrose and ammonium chloride were subsequently added thereto, and the resulting mixture was continuously stirred, obtaining a clear solution, in which the concentration of sucrose was 5 mol/L, and the concentration of ammonium chloride was 2 mol/L.

(3) The beaker containing the clear solution was placed in an oven and pre-sintered at a temperature of 150° C. for 2 h, obtaining a metal salt-supported three-dimensional sucrose foam.

(4) Finally, the obtained glucose foam was placed in a muffle furnace, calcined at 500° C. for 10 h, washed with deionized water, and dried, obtaining a Pd—Mo based mixed oxide catalyst $Pd_{0.8}Mo_{0.2}O_2$.

Example 8

(1) A certain amount of $K_2PtCl_6$, $CoCl_2 \cdot 6H_2O$ and $Zn(NO_3)_2 \cdot 6H_2O$ were weighed and dissolved in deionized water such that the sum of concentrations of metal salts was 0.2 mol/L, wherein the concentrations of $Pt^{2+}$, $Co^{2+}$ and $Zn^{2+}$ were 0.14 mol/L, 0.03 mol/L and 0.03 mol/L, respectively.

(2) Fructose and urea were subsequently added thereto, and the resulting mixture was continuously stirred, obtaining a clear solution, in which the concentration of fructose was 0.1 mol/L, and the concentration of urea was 2 mol/L.

(3) The beaker containing the clear solution was placed in an oven and pre-sintered at a temperature of 150° C. for 4 h, obtaining a metal salt-supported three-dimensional fructose foam.

(4) Finally, the obtained fructose foam was placed in a muffle furnace, calcined at 500° C. for 6 h, washed with deionized water, and dried, obtaining a Pt—Co—Zn based mixed oxide catalyst $Pt_{0.7}Co_{0.15}Zn_{0.15}O_2$.

Example 9

(1) A certain amount of $PdCl_2$, $(NH_4)_6Mo_7O_{24} \cdot 4H_2O$ and $Cu(NO_3)_2 \cdot 6H_2O$ were weighed and dissolved in deionized water such that the sum of concentrations of metal salts was 0.2 mol/L, wherein the concentrations of $Pd^{2+}$, $MoO_4^{2-}$ and $Cu^{2+}$ were 0.14 mol/L, 0.03 mol/L and 0.03 mol/L, respectively.

(2) Maltose and ammonium sulfate were subsequently added thereto, and the resulting mixture was continuously stirred, obtaining a clear solution, in which the concentration of maltose was 0.5 mol/L, and the concentration of ammonium sulfate was 2 mol/L.

(3) The beaker containing the clear solution was placed in an oven and pre-sintered at a temperature of 130° C. for 10 h, obtaining a metal salt-supported three-dimensional maltose foam.

(4) Finally, the obtained maltose foam was placed in a muffle furnace, calcined at 600° C. for 10 h, washed with deionized water, and dried, obtaining a Pd—Mo—Cu based mixed oxide catalyst $Pd_{0.7}Mo_{0.15}Cu_{0.15}O_2$.

FIGS. 1A-1D show the morphology characterization of the multi-metal oxide catalyst prepared in Example 6 of the present disclosure. From the SEM image (FIG. 1A), it can be seen that the catalyst is in the form of porous foam sheets. Through TEM images (FIGS. 1B-1D), it can be seen that the foam sheet catalyst is composed of fine crystal grains, similar to the foam structure made of small building blocks. From the high-resolution images, it can be seen that the small crystal grains are in a size of about several nanometers.

Figure 2A:
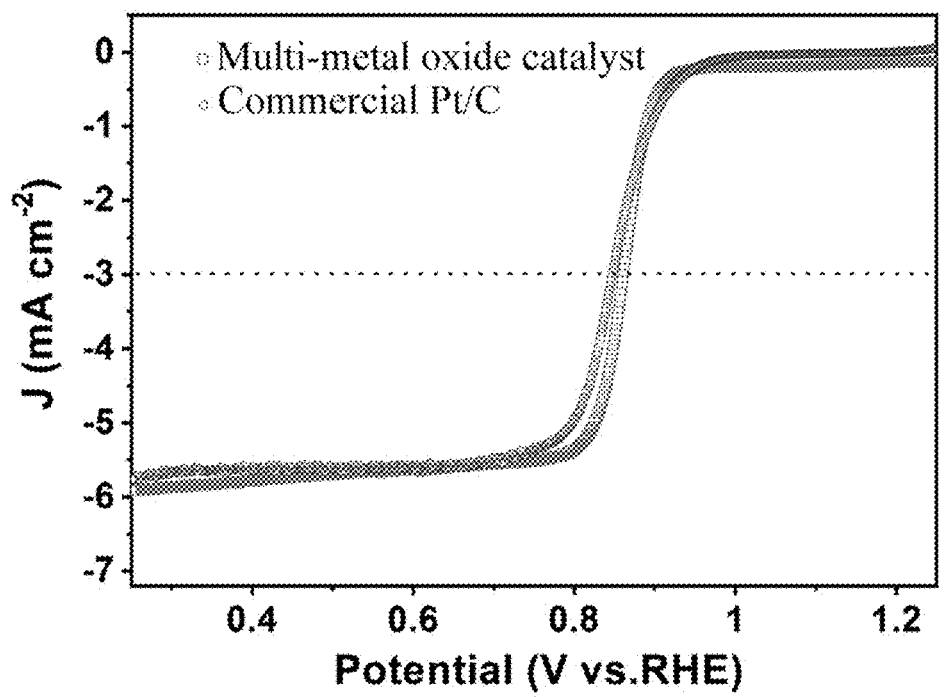
FIGS. 2A-2D show the linear sweep voltammetry (LSV, FIG. 2A and FIG. 2C) curve and the accelerated cycling stability test curve (FIG. 2B and FIG. 2D) of the catalyst prepared in Example 6 and the commercial Pt/C, $IrO_2$ catalyst in the ORR and OER reactions.
Figure 2B:
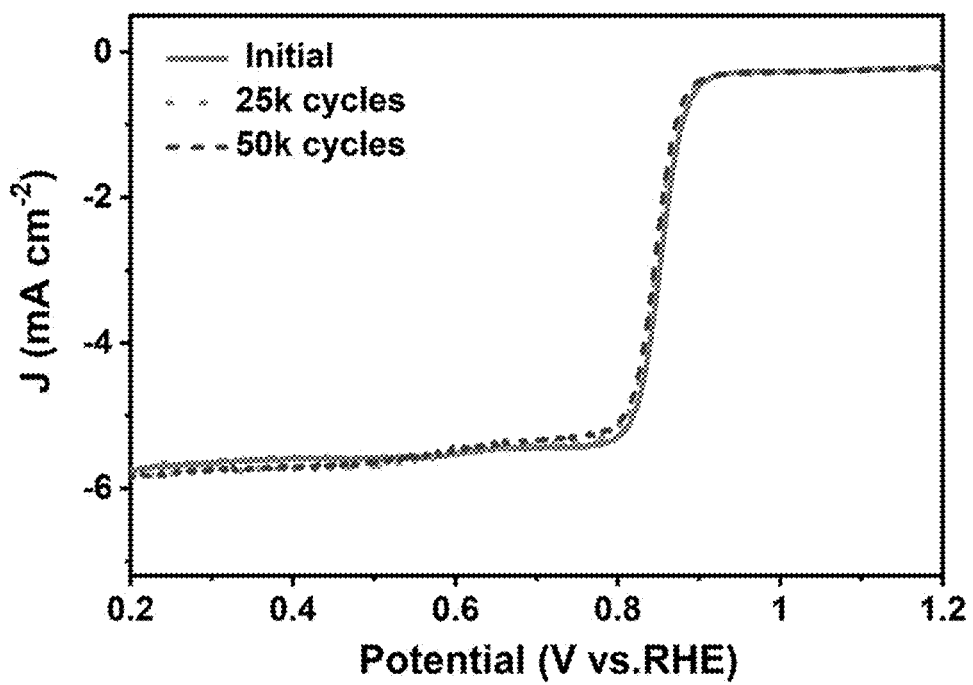
Figure 2C:
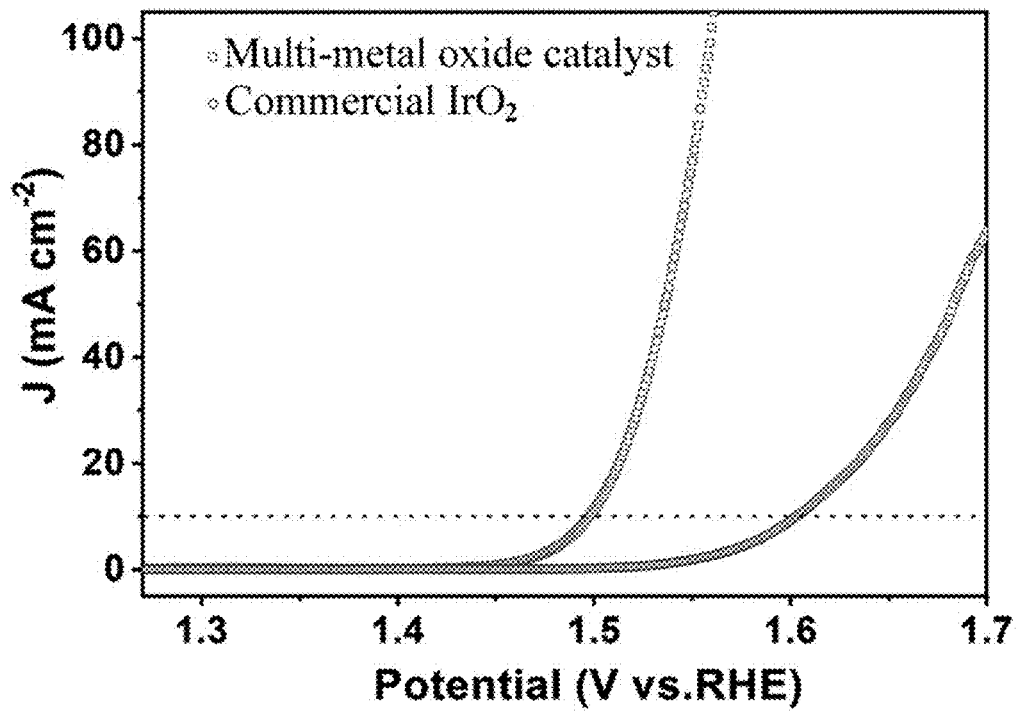
Figure 2D:
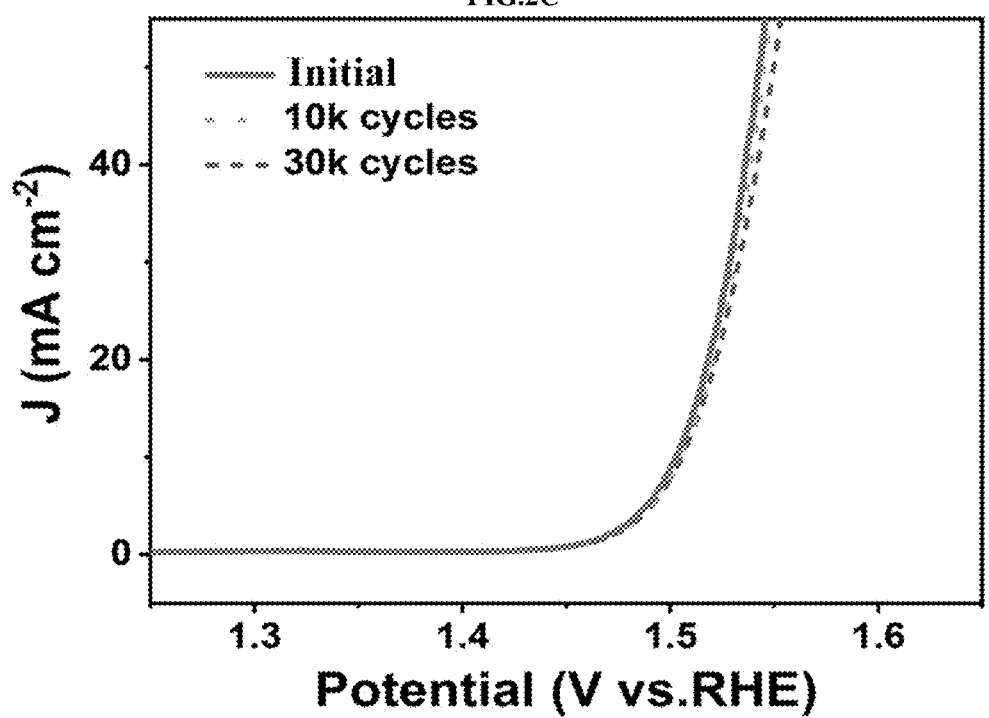
Figure 3A:
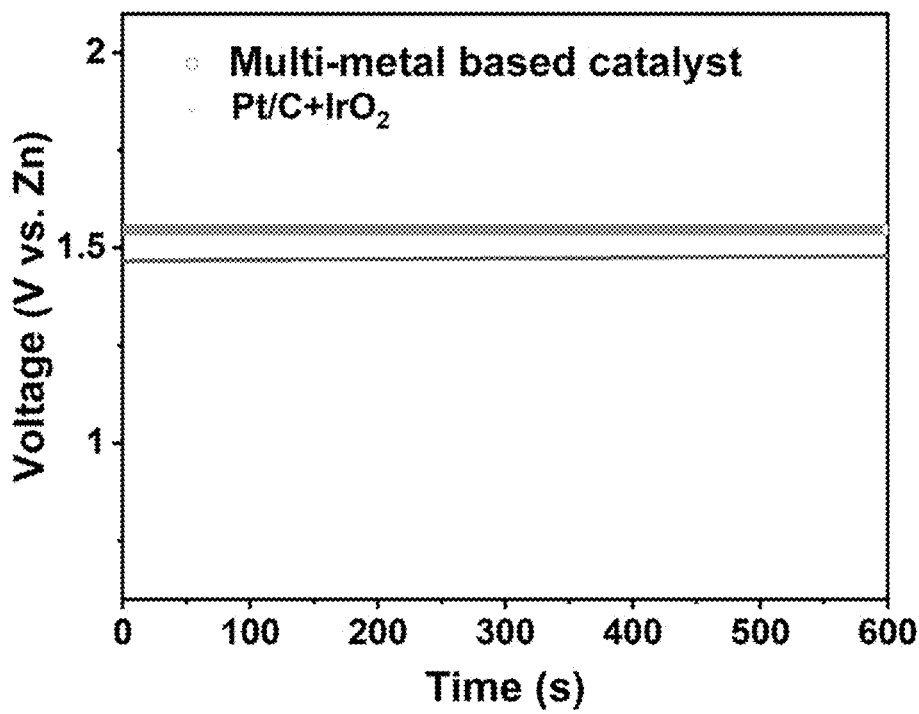
FIGS. 3A-3D show the open circuit voltage-time curve (FIG. 3A), discharge power density curve (FIG. 3B), discharge rate performance curve (FIG. 3C), and constant current charge-discharge cycling stability curve (FIG. 3D) of zinc-air batteries when the catalyst prepared in Example 6 and the commercial Pt/C+$IrO_2$ catalyst are used as the air electrodes of the zinc-air batteries.
Figure 3B:
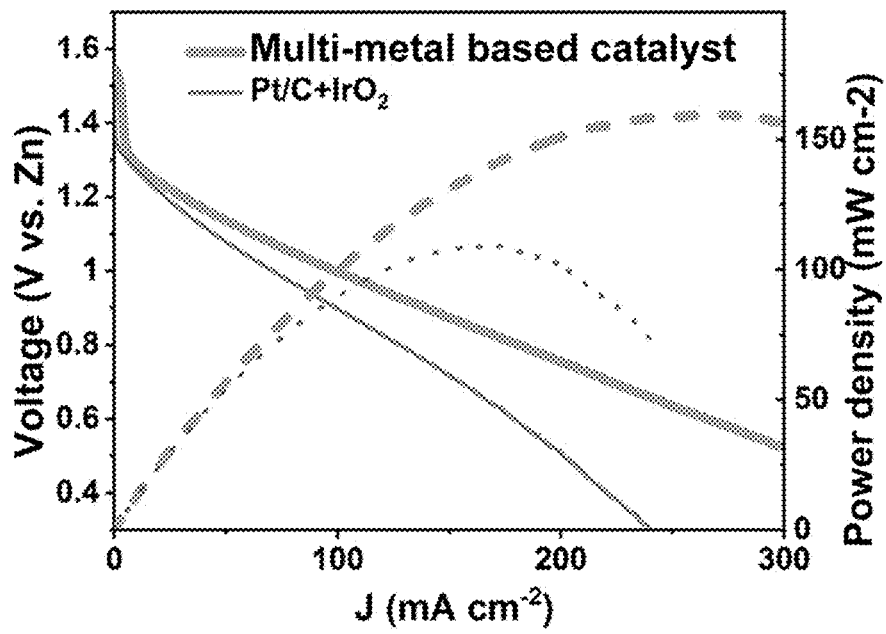
Figure 3C:
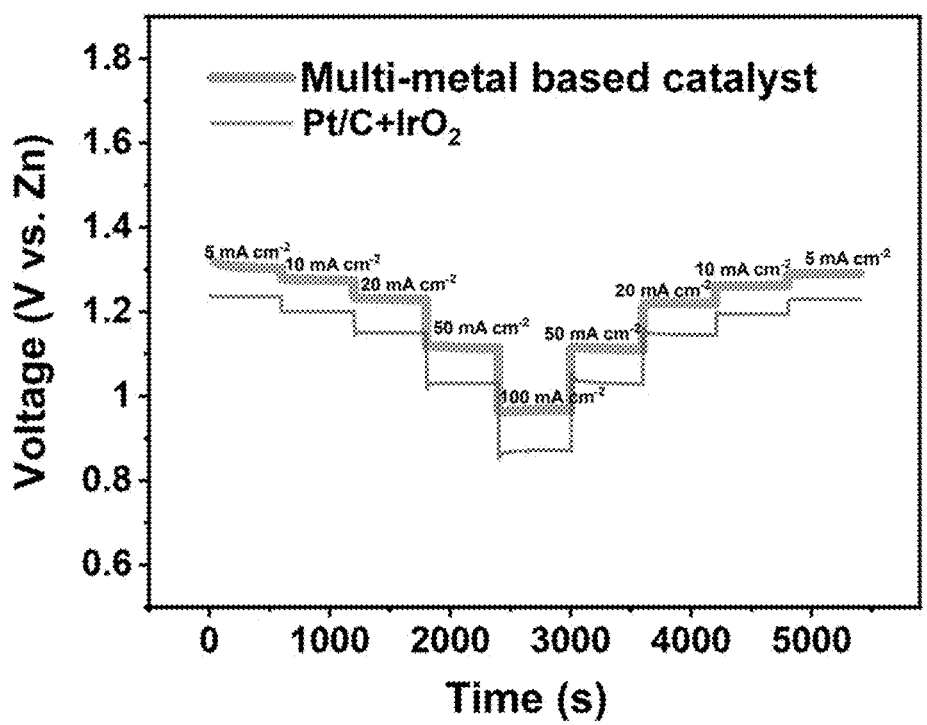
Figure 3D:
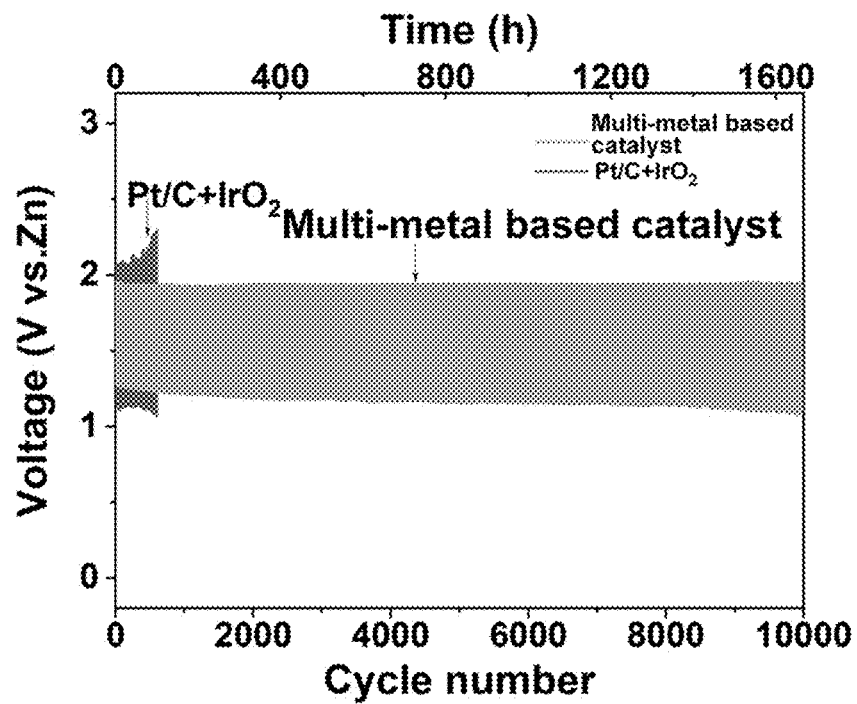

FIGS. 2A-2D show the ORR and OER performance characterization of the multi-metal oxide catalyst prepared in Example 6 of the present disclosure. The test method is a cyclic voltammetry, and the experimental instrument used is the Chenhua electrochemical workstation. From the LSV curve of ORR (FIG. 2A), it can be seen that the half-wave potential of the catalyst can reach 0.86 V, which is better than that of the Pt/C catalyst. After 50,000 CV cycles (FIG. 2B), the change of half-wave potential is small, which proves that the cycling stability of the catalyst for ORR is very good. From the LSV curve of OER (FIG. 2C), it can be seen that the overpotential of the catalyst at 10 mA cm$^{-2}$ is only 270 mV, which is far superior to the commercial $IrO_2$ catalyst. After 30,000 CV cycles, the overpotential is basically unchanged (FIG. 2D). Through the analysis of the bifunctional performance, it can be seen that the multi-metal oxide catalyst has a very low ORR/OER bifunctional overpotential ($\Delta E$), and the $\Delta E$ is only 0.64 V, which is much lower than those of the commercial Pt/C+$IrO_2$ catalyst and similar systems reported in the literature.

FIGS. 3A-3D show the zinc-air battery performance characterization when the multi-metal oxide catalyst prepared in Example 6 of the present disclosure is used as an air electrode material, in which the mold used is a Changsha Spring zinc-air battery test mold, and the water-based zinc-air battery test method is adopted. From FIG. 3A and FIG. 3B, it can be seen that when the multi-metal oxide catalyst is used as the air electrode material, the open circuit voltage and power density of the battery are larger than those of the battery in which the commercial Pt/C+$IrO_2$ catalyst is used as the air electrode material. When performing rate discharge, at the same current density, the voltage plateau of the battery in which the catalyst is used as an air electrode material is significantly higher than that of the battery in which the commercial Pt/C+$IrO_2$ catalyst is used as the air electrode material (FIG. 3C), which proves that a better rate discharge performance is achieved when the catalyst is used as an air electrode. Finally, the charging and discharging gap of the battery constructed by using the multi-metal oxide catalyst is basically unchanged after 10,000 cycles (1667 h) of constant current charging and discharging cycles (FIG. 3D), while for the battery constructed by using the commercial Pt/C+$IrO_2$ catalyst, the performance is significantly decreased at 600 cycles, which proves that the zinc-air battery constructed by using the inventive catalyst has excellent cycling stability.

For catalysts prepared in other examples of the present disclosure when used as air electrode materials, technical effects similar to those of Example 6 are also obtained.

Although the implementation manners disclosed in the present disclosure are described above, the contents described are only the implementation manners used for facilitating the understanding of the present disclosure, and not intended to limit the present disclosure. Anyone skilled in the field to which the present disclosure belongs, without departing from the spirit and scope disclosed in the present disclosure, could make any modifications and changes in the implementation forms and details. However, the scope of the present disclosure shall be defined by the appended claims.

What is claimed is:

1. A method for preparing a bifunctional oxygen electrocatalyst, the bifunctional oxygen electrocatalyst being represented by $A_{1-x-y}B_xC_yO_2$, wherein;
   element A is one selected from the group consisting of Pt, Ir, Ru, and Pd;
   each of element B and element C is selected from the group consisting of Mo, Mn, Fe, Co, Ni, Cu, and Zn;
   the bifunctional oxygen electrocatalyst is a three-dimensional porous foam sheet catalyst; and x and y represent atomic percentages of the element B and the element C, respectively, and a sum of atomic percentages of the element A, the element B and the element C in the catalyst is 100 at. %;

optionally, the element B is the same as the element C; the method comprising;

1) mixing a metal salt of the element A, a metal salt of the element B, a metal salt of the element C with a carbohydrate and a gas generating compound uniformly in water to form a precursor solution; and 2) pre-sintering the precursor solution, and calcining the product obtained after pre-sintering to obtain the bifunctional oxygen electrocatalyst.

2. The method for preparing the bifunctional oxygen electrocatalyst as claimed in claim 1, wherein the carbohydrate is one or more selected from the group consisting of chitosan, sucrose, fructose, glucose, maltose, cellulose, starch, hemicellulose, mannose, fructan, xylitol, arabinose, erythrose, sorbitol, and *Helianthus tuberosus*.

3. The method for preparing the bifunctional oxygen electrocatalyst as claimed in claim 1, wherein the gas generating compound is one or more selected from the group consisting of thiourea, ammonium chloride, urea, and ammonium sulfate.

4. The method for preparing the bifunctional oxygen electrocatalyst as claimed in claim 1, wherein in step 1), a concentration of the carbohydrate in the precursor solution is in the range of 0.1-10 mol/L;

optionally, a concentration of the gas generating compound in the precursor solution is in the range of 0.1-10 mol/L; and optionally, in the precursor solution, the sum of concentrations of the metal salt of the element A, the metal salt of the element B, and the metal salt of the element C is in the range of 0.01-1 mol/L.

5. The method for preparing the bifunctional oxygen electrocatalyst as claimed in claim 4, wherein the concentration of the carbohydrate in the precursor solution is in the range of 2-8 mol/L.

6. The method for preparing the bifunctional oxygen electrocatalyst as claimed in claim 4, wherein the concentration of the gas generating compound in the precursor solution is in the range of 2-8 mol/L.

7. The method for preparing the bifunctional oxygen electrocatalyst as claimed in claim 4, wherein in the precursor solution, the sum of concentrations of the metal salt of the element A, the metal salt of the element B, and the metal salt of the element C is in the range of 0.01-0.1 mol/L.

8. The method for preparing the bifunctional oxygen electrocatalyst as claimed in claim 1, wherein the pre-sintering in step 2) is performed at a temperature of 30-300° C.; and optionally, the pre-sintering is performed for 0.1-100 h.

9. The method for preparing the bifunctional oxygen electrocatalyst as claimed in claim 8, wherein the pre-sintering in step 2) is performed at a temperature of 100-200° C.

10. The method for preparing the bifunctional oxygen electrocatalyst as claimed in claim 8, wherein the pre-sintering is performed for 1-20 h.

11. The method for preparing the bifunctional oxygen electrocatalyst as claimed in claim 1, wherein the calcining in step 2) is performed at a temperature of 100-800° C.; and optionally, the calcining is performed for 0.1-100 h.

12. The method for preparing the bifunctional oxygen electrocatalyst as claimed in claim 11, wherein the calcining in step 2) is performed at a temperature of 300-700° C.

13. The method for preparing the bifunctional oxygen electrocatalyst as claimed in claim 11, wherein the calcining is performed for 1-20 h.

* * * * *